(12) United States Patent
Godshaw et al.

(10) Patent No.: US 7,048,101 B2
(45) Date of Patent: May 23, 2006

(54) COLLAPSIBLE STORAGE AND CARRYING CASE

(75) Inventors: Donald E. Godshaw, Evanston, IL (US); Andrezj Redzisz, Wheeling, IL (US)

(73) Assignee: Travelon, Elk Grove Village, IL (US)

( * ) Notice: Subject to any disclaimer, the term of this patent is extended or adjusted under 35 U.S.C. 154(b) by 0 days.

(21) Appl. No.: 11/117,100

(22) Filed: Apr. 28, 2005

(65) Prior Publication Data

US 2005/0183913 A1   Aug. 25, 2005

Related U.S. Application Data

(63) Continuation of application No. 10/393,329, filed on Mar. 20, 2003, which is a continuation-in-part of application No. 09/968,360, filed on Oct. 1, 2001, now Pat. No. 6,550,592.

(51) Int. Cl.
    A45C 5/14      (2006.01)
    A45C 7/00      (2006.01)
    A45C 13/04     (2006.01)

(52) U.S. Cl. ............... 190/18 A; 190/39; 190/107; 190/127

(58) Field of Classification Search ........... 190/18 R, 190/18 A, 39, 107, 127, 115; 280/37; 119/496, 119/497
    See application file for complete search history.

(56) References Cited

U.S. PATENT DOCUMENTS

| | | | |
|---|---|---|---|
| 2,170,379 A * | 8/1939 | Ortt ................... | 190/107 |
| 2,318,527 A | 5/1943 | Rosenthal | |
| 2,574,089 A | 11/1951 | Cochran | |
| 2,798,579 A | 7/1957 | Fox | |
| 3,861,703 A * | 1/1975 | Gould ................ | 280/47.131 |
| 3,934,895 A | 1/1976 | Fox | |
| 4,588,056 A | 5/1986 | Bernbaum | |
| 4,589,530 A | 5/1986 | Sher | |
| 4,596,397 A | 6/1986 | Conti | |
| 4,629,040 A | 12/1986 | Jones | |
| 4,743,038 A * | 5/1988 | Myers et al. ........... | 280/40 |
| 4,951,818 A * | 8/1990 | Johnson ............... | 206/315.1 |
| 4,977,857 A * | 12/1990 | Slawinski .............. | 119/497 |
| 5,022,574 A * | 6/1991 | Cesari ................. | 224/153 |
| 5,024,455 A * | 6/1991 | Schrecongost .......... | 280/37 |
| 5,103,945 A * | 4/1992 | Kaneko ................ | 190/107 |
| 5,170,745 A * | 12/1992 | Burdette, Jr. ........... | 119/497 |
| 5,197,580 A | 3/1993 | Berman et al. | |
| 5,323,886 A | 6/1994 | Chen | |
| 5,431,262 A | 7/1995 | Rekuc et al. | |
| 5,518,315 A | 5/1996 | Nichols | |
| 5,524,737 A | 6/1996 | Wang | |
| 5,524,920 A | 6/1996 | Tsai | |
| 5,603,573 A | 2/1997 | Mercier et al. | |
| 5,653,318 A | 8/1997 | Field | |
| 5,676,296 A * | 10/1997 | Masters ............... | 224/653 |

(Continued)

FOREIGN PATENT DOCUMENTS

EP      0 157 968      10/1985

(Continued)

Primary Examiner—Sue A. Weaver
(74) Attorney, Agent, or Firm—Banner & Witcoff, Ltd.

(57) ABSTRACT

A collapsible bag construction includes a telescoping handle mounted on a bracket with a portion of the bracket extending along the bottom edge of the collapsible bag and cooperative with a supplemental or auxiliary rigid bottom panel that may be removed to permit the collapsible bag to be folded for storage.

12 Claims, 15 Drawing Sheets

U.S. PATENT DOCUMENTS

| | | | |
|---|---|---|---|
| 5,749,446 A | 5/1998 | Hsieh | |
| 5,749,503 A * | 5/1998 | Wulf et al. | 224/153 |
| 5,806,638 A * | 9/1998 | Mao | 190/115 |
| 5,829,558 A * | 11/1998 | Cheng | 190/116 |
| 5,918,710 A * | 7/1999 | Sher | 190/18 A |
| 5,941,195 A * | 8/1999 | Martz | 119/497 |
| 6,053,381 A | 4/2000 | Fahl et al. | 224/153 |
| 6,059,078 A | 5/2000 | Nykoluk | |
| 6,076,485 A * | 6/2000 | Peeples et al. | 119/497 |
| 6,095,090 A * | 8/2000 | Burns et al. | 119/497 |
| 6,109,404 A | 8/2000 | Bishop | |
| 6,155,206 A * | 12/2000 | Godshaw | 119/453 |
| 6,227,339 B1 | 5/2001 | Bogert | |
| 6,244,399 B1 * | 6/2001 | Birkestrand | 190/103 |
| 6,286,461 B1 * | 9/2001 | Martz | 119/497 |
| 6,550,592 B1 | 4/2003 | Godshaw et al. | |
| 2002/0084159 A1 * | 7/2002 | Hamlin | 190/107 |
| 2003/0038008 A1 * | 2/2003 | Han | 190/115 |
| 2003/0127060 A1 * | 7/2003 | Yeung | 119/497 |

FOREIGN PATENT DOCUMENTS

| | | |
|---|---|---|
| FR | 948917 | 8/1949 |
| GB | 619686 | 3/1949 |
| GB | 779784 | 7/1957 |
| GB | 1568963 | 6/1980 |
| GB | 2346078 A | 8/2000 |
| JP | 51-135042 | 11/1976 |
| JP | 08-000330 | 8/1996 |

* cited by examiner

COLLAPSIBLE STORAGE AND CARRYING CASE

CROSS REFERENCE TO RELATED APPLICATION

This application is a continuation of and claims benefit of U.S. continuation in part application Ser. No. 10/393,329, filed Mar. 20, 2003, pending incorporated herein by reference, which is based on, and claims benefit of, U.S. continuation in part application of Ser. No. 09/968,360, filed Oct. 1, 2001 (now U.S. Pat. No. 6,550,592) entitled, Collapsible Storage and Carrying Case for which priority is claimed and which is incorporated herein by reference.

BACKGROUND OF THE INVENTION

In a principal aspect, the present invention relates to a class of luggage items, bags, and containers, wherein the luggage item, bag or container is generally comprised of flexible material such as fabric, canvas or leather and further wherein the item, container or bag includes a telescoping handle, wheels and a removable, supplemental, reinforcing bottom plate for maintaining the shape and general configuration of the flexible bag.

Use of a flexible bag, container or luggage item is often preferred inasmuch as such items are more easily stored because they can be folded or made compact when not in use. Additionally, such items are typically lighter in weight. Also, because soft-sided luggage items, containers or bags have flexible sides, they may be used to hold and transport uniquely shaped items that could not be easily placed and stored in a hard-sided luggage item or container. Further, flexible bags are often more economical to manufacture and easier to move or transport.

Despite their many desirable characteristics, flexible containers, bags or luggage items are often difficult to construct with a telescoping handle and wheels which facilitate ease of transport, particularly when the luggage item, container or bag is large. Thus, there has developed a need to provide flexible or soft-sided luggage items, containers or bags which have certain characteristics typically associated with hard-sided luggage, including the characteristic of being susceptible to incorporation of a telescoping handle and transport wheels.

SUMMARY OF THE INVENTION

Briefly, the present invention comprises a collapsible luggage item made from a flexible bag with a back side panel and a flexible bottom panel which enables compaction for storage when not in use. A telescoping handle is affixed to the back side panel of the bag and more particularly to a rigid bracket positioned at the juncture of the flexible side and bottom panels. The flexible bottom panel of the bag is designed to incorporate a removable, supplemental, rigid bottom panel or plate. The supplemental bottom panel or plate is capable of slidably engaging the rigid bracket member positioned at the juncture of the flexible side panel and the flexible bottom panel. When engaged, The rigid, supplemental bottom panel provides a means to reinforce and maintain the flexible bottom panel when fully open or not compacted to thereby facilitate maintenance of the full shape of the container, luggage item, or bag for use to pack and store items. The supplemental, rigid, attachable and detachable bottom panel may easily be stored within the bag or container when not in use, yet may be easily attached to the flexible bottom panel and rigid bracket when the luggage item is to be used. Various embodiments are depicted including an embodiment for carriage of tools, an embodiment comprising an insulated cooler, an embodiment which incorporates an internal frame that may be incorporated with the flexible side panel, an embodiment that serves as a pet carrier, car seat, backpack and pet bed, as well as other alternative embodiments.

Thus, it is an object of the invention to provide an improved flexible bag which includes a telescoping handle and a supplemental or ancillary, rigid or stiff bottom panel cooperative with a bracket that supports the telescoping handle.

It is a further object of the invention to provide an improved flexible bag construction which has multiple embodiments including an embodiment as a tool carrier, an insulated container, a duffel bag, a pet carrier or a golf bag, among others.

Yet another object of the invention is to provide an inexpensive, rugged, easily stored, yet easily assembled soft-sided flexible luggage item, container or bag.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENTS

Figure 1:
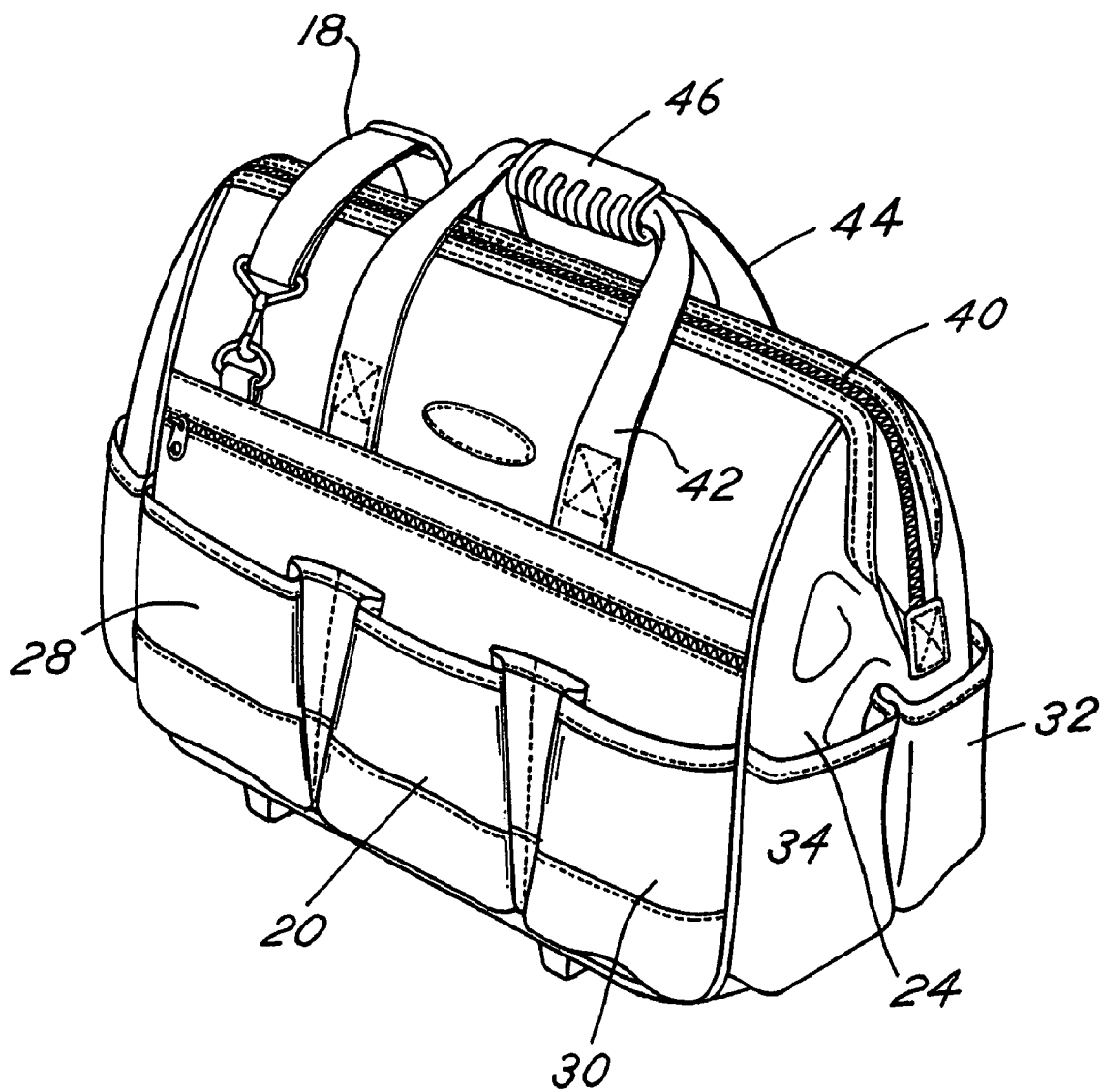
FIG. 1 is an isometric view of a first embodiment of a bag designed specifically for carrying tools.
Figure 2:
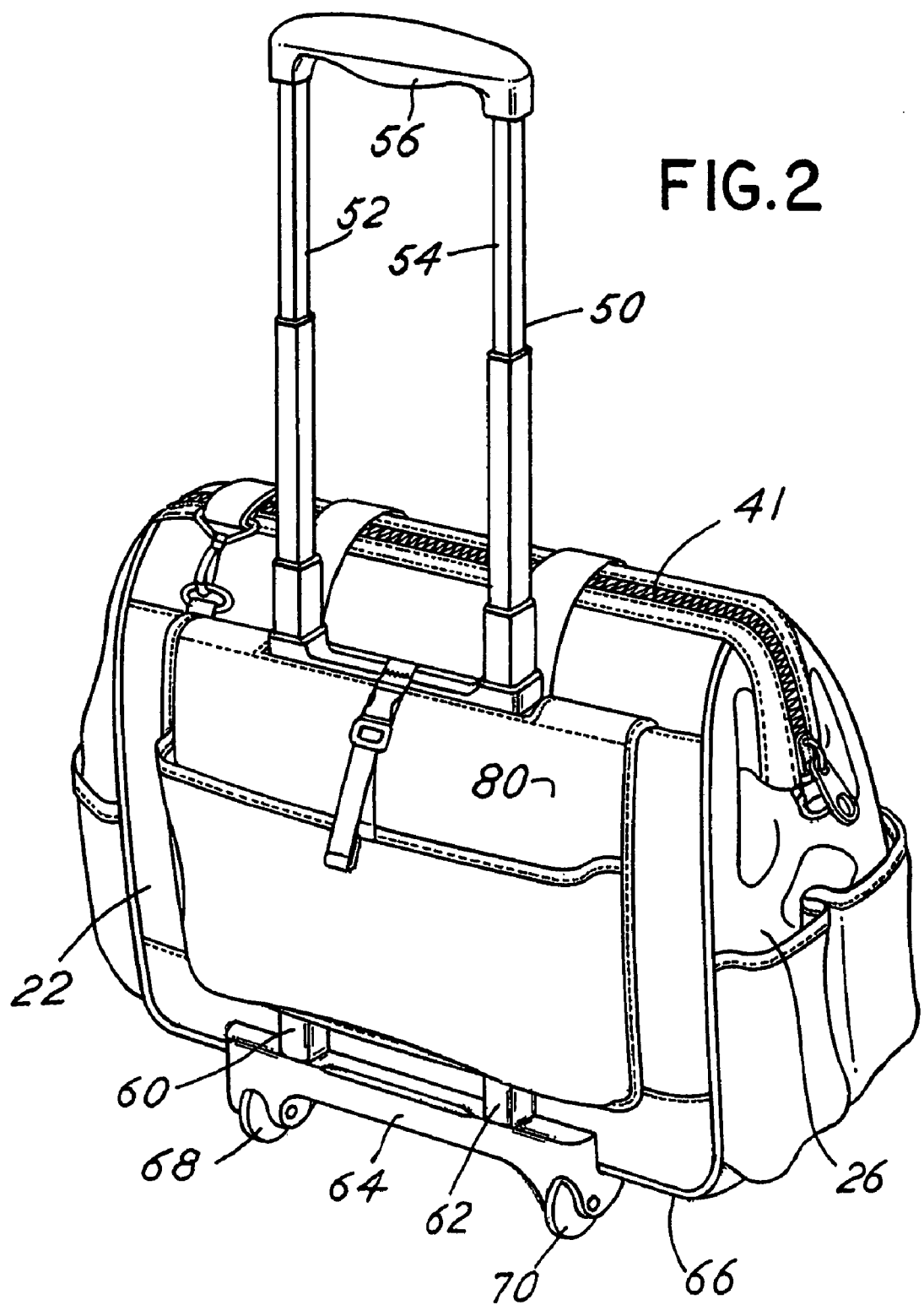
FIG. 2 is an isometric view of the bag of FIG. 1 as viewed from the back side or opposite side depicted in FIG. 1.
Figure 3:
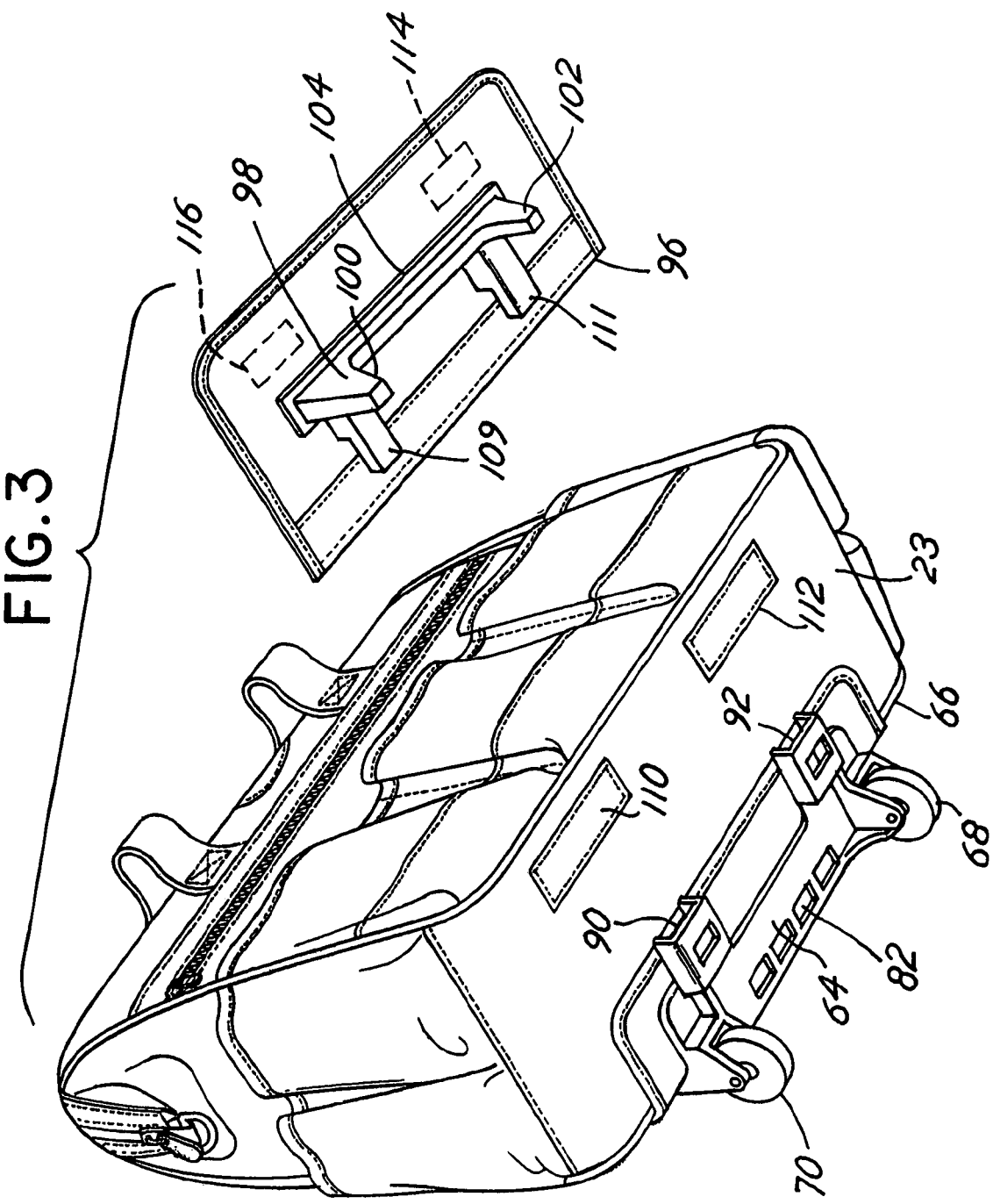
FIG. 3 is an exploded isometric view of the bag of FIG. 1 as viewed from the underside or bottom side thereof depicting a rigid supplemental or auxiliary bottom panel or plate which is used to maintain the configuration of the bag when it is assembled and ready for use.
Figure 4:
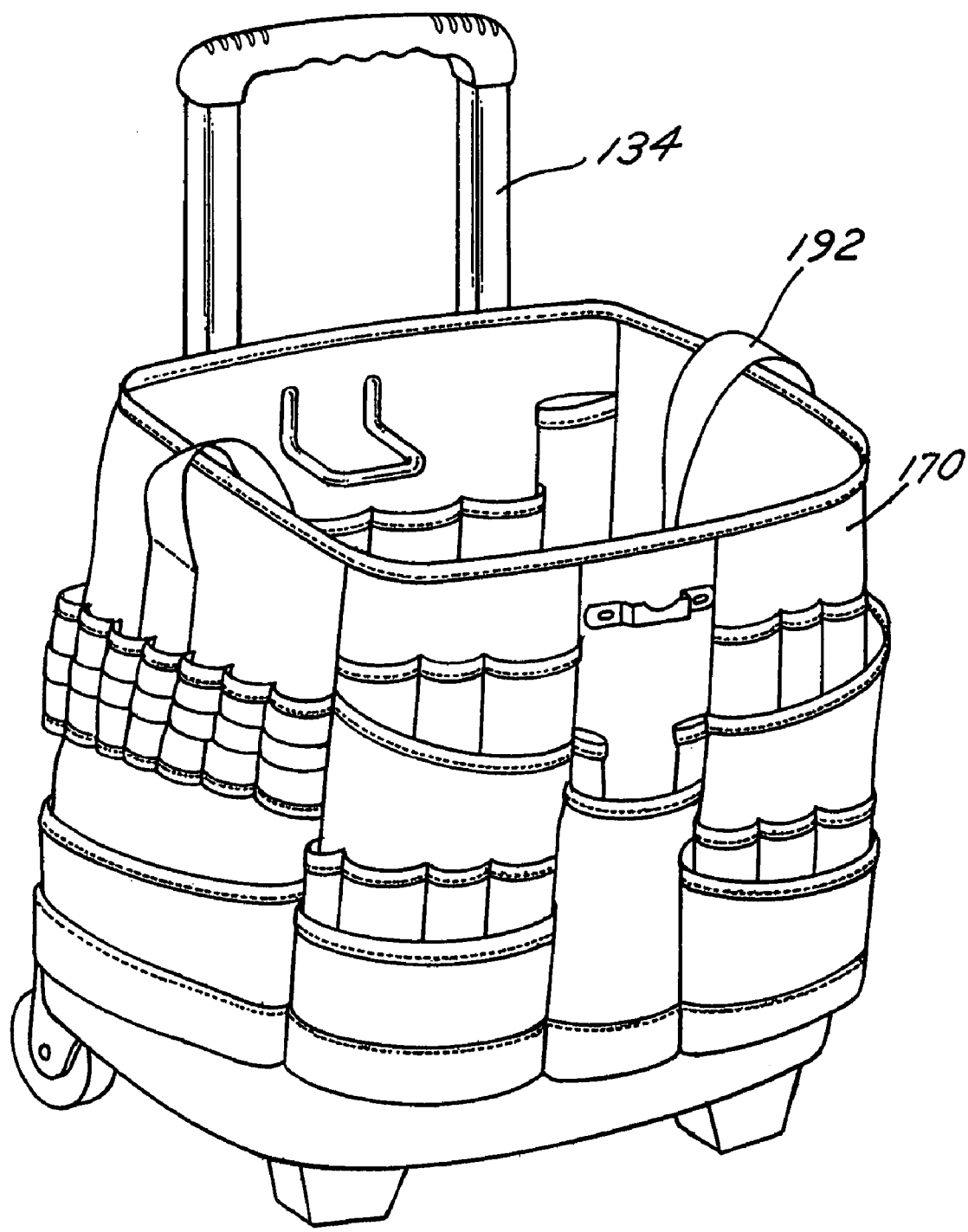
FIG. 4 is an isometric view of a second embodiment of the invention useful as a tool or implement holder and incorporating a telescoping handle, wheels and a supplemental bottom panel to maintain the shape or configuration of the container or bag.
Figure 5:
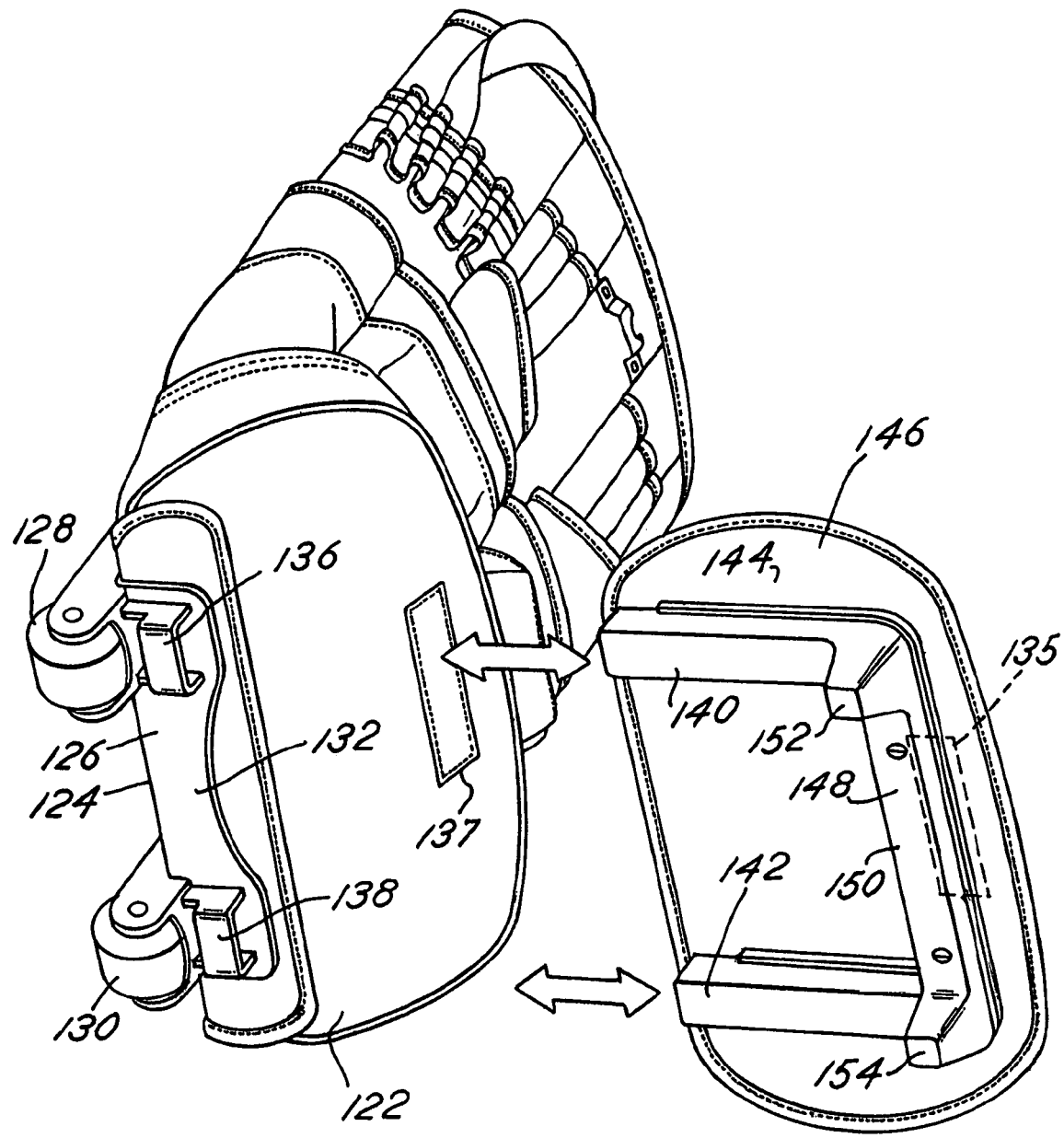
FIG. 5 is an exploded isometric view of the embodiment of FIG. 4 depicting the assembly of the supplemental or ancillary or auxiliary bottom panel with the container or bag.

FIGS. 1, 2 and 3 illustrate a first preferred embodiment of the invention as incorporated in a wide mouth tool bag. The bag is fabricated from leather, canvas, or other flexible fabric and includes a front side 20, a back side 22, a first lateral side 24 and a second lateral side 26. External pouches or pockets such as pockets 28 and 30 are provided on the outside face of front side 20, for example. Lateral side 24 also includes flexible pockets or pouches 32 and 34. Typically, the pouches or pockets 28, 30, 32 and 34 are formed from flexible material with folds and an open top so that the pockets or pouches are expandable for support and retention of tools or the like.

The embodiment of FIGS. 1–3 further includes a top opening 41 with a zipper 40 for access to the interior of the bag. The lateral sides 24 and 26 are folded adjacent the top zipper opening 41 and when the zipper 40 is open, then the access to the interior of the bag is a wide mouth opening. A first handle 42 and a second handle 44 are stitched to the opposite panel sides 20 and 22 and are joined by means of a handle grip member 46. The handle grip member 46 may be released so that the handles 42 and 44 are no longer connected or joined thereby enhancing access to the interior of the bag. Auxiliary carrying strap 18 may also be stitched to the bag and more particularly, to the front panel 20 and back panel 22. The construction of the bag so far described is generally typical of soft-sided wide mouth carrying bags.

The invention relates particularly to the combination of a telescoping handle, wheels, and a rigid, supplemental or ancillary bottom plate which together enable the bag to be provided with structural integrity, yet when the auxiliary bottom panel is removed, permits the bag to be folded or compacted for ease of storage, transport or the like.

Thus, the bag includes a telescoping handle 50 which has, or includes, first and second spaced telescoping bars or rods 52 and 54 connected by handle member 56. The telescoping bars or rods 52 and 54 comprise a series of sections which telescope into vertical housings 60 and 62 mounted on a cross bracket 64 adjacent a connection or junction 66 between back panel 22 and a bottom panel 23. The juncture 66 thus defines the transition between back panel 22 and bottom panel 23. The bracket 64 accommodates a first wheel 68 and a second wheel 70 spaced apart one from each other at the juncture 66. With this construction, the telescoping handle 50 may be expanded to enable carriage or transport of the bag on the wheels of 68, 70. In the embodiment depicted, the telescoping handle 50 fits or is retained by means of a panel 80 forming a portion of a pouch on the side 22 of the bag. The telescoping handle 50 stiffens or renders generally rigid at least a portion of the back side 22. The bracket 64 reinforces or renders rigid the juncture 66.

The bracket 64 includes a horizontally extending section 82 which is fastened to the flexible bottom panel 23. The section 82 extends from the juncture 66 forwardly for approximately 1–3 inches and is preferably made from a rigid material such as a molded plastic material. The rigid partial panel or section 82 includes a first pocket or receptacle 90 and a second space pocket or receptacle 92 which will be described in greater detail hereinafter.

As depicted in FIG. 3, an auxiliary or supplemental, rigid, flat planar generally rectangular bottom plate 96 is provided to cooperate with the bottom panel 23 and the bracket 64. More specifically, the supplemental bottom panel 96 includes a molded plastic foot construction 98 with a first molded foot 100 and a second spaced molded foot 102 attached together by means of a cross bar 104. Extending transversely from the feet 100 and 102 are bayonet members 109 and 111. The bayonet members 109 and 111 include leading prongs which fit into the pockets or receptacles 90 and 92, respectively, and are retained therein by or as a result of a fastening hook and loop mechanism including the loop strip 110 and strip 112 on the bottom side 23 of the bag or container. Compatible with the loop strip 110 and 112 are similar aligned hook strips 114 and 116. Engaging the hook and loop mechanism (typically Velcro fastener) can be accomplished by sliding the bayonet connections or members 109 and 111 into their respective pockets 90 and 92. The bottom panel 96 thus is retained in a fixed or locked configuration by means of a fastening means, i.e., strips 110, 112, 114 and 116.

In this manner, the auxiliary plate or member 96 may be easily removed from engagement with the bag or attached thereto and retained to provide a means for stiffening the bottom panel 23. However, the rigid supplemental or ancillary bottom panel 96 may be easily removed as necessary by disengaging the hook and loop fasteners 110, 112, 114, 116 and sliding the bayonet connections 109, 111 from engagement with the pockets 90, 92. With the described construction, therefore, the bottom panel 96 renders rigid and thus supports the flexible bag and its contents. By helping to form or shape the bag, it is possible to more efficiently store materials in the bag. Further, because the bag is made more rigid, the utilization of a telescoping handle and wheels associated therewith is rendered possible and more functional. The internal contents of the bag may also be more easily contained and accessed with such a construction.

FIGS. 4–7 illustrate an alternative embodiment. The embodiment of FIGS. 4–7 is directed to a construction wherein a tool carrier is comprised of, and has the form of, an open top bag which is fitted over a frame. Referring to the Figures, the container or bag includes an outside circumferential panel 120, which is made from a flexible material such as canvas or fabric, and a flexible bottom panel 122. The bottom panel 122 is joined to the side panel 120 along a seam, juncture or junction 124. In a manner similar to the embodiment of FIGS. 1–3, the bottom juncture 124 receives a bracket 126 which supports wheels 128 and 130 as well as a transverse generally horizontal flat planar, supplemental and removable rigid bottom plate 132. The bottom plate 132 supports bracket 126 to which a telescoping handle 134 is attached in a fashion similar to that as depicted in embodiment of FIGS. 1–3. Also attached or affixed to the bottom 122 is a hook and loop fastener mechanism 137. The fastener mechanism 137 is spaced from the bracket 126. The bracket 126 includes a first pocket 136 and a second pocket 138 which are adapted to receive bayonet projections 140 and 142, respectively, affixed to the outside face 144 of a supplemental or ancillary bottom plate 146. The bayonet connectors 140 and 142 are part of a foot bracket 148 which is affixed to the outside face 144 of the plate 146. The foot bracket 148 includes a cross member 150 and a first foot 152 as well as a second spaced foot 154 attached thereto. The bayonet members 140 and 142 fit into the pockets 136 and 138, respectively and are retained thereby by the fastening means (strip) 137 which works in combination with a fastening means (strip) 135 on the inside surface of the plate 146. In this manner, the bottom panel 122 of the embodiment of FIGS. 4–7 is made rigid or reinforced.

Figure 6:
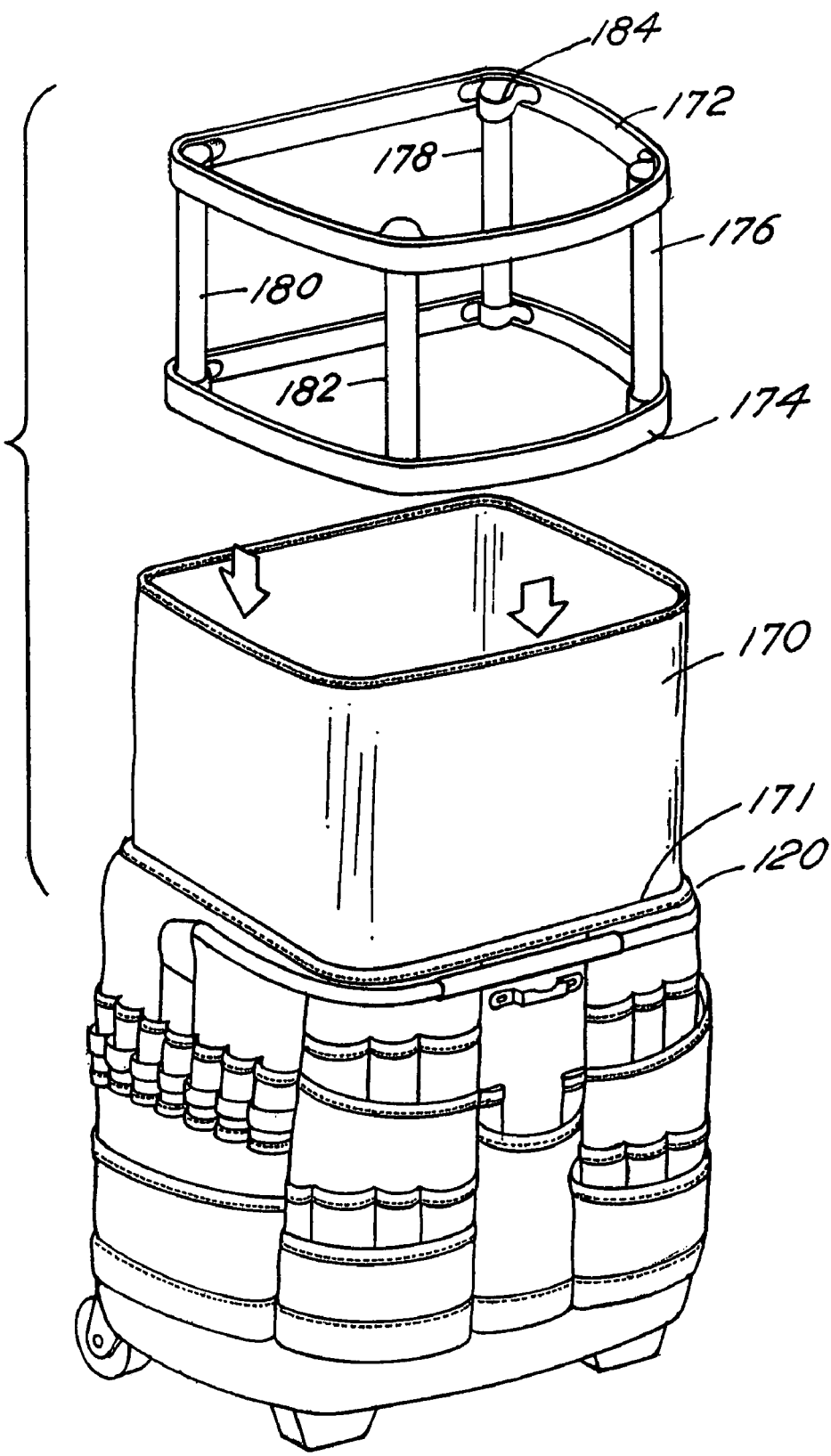
FIG. 6 is an exploded isometric view of the bag of FIG. 4 depicting the manner of assembly of an internal frame which is used in combination with the flexible bag comprising the container.
Figure 7:
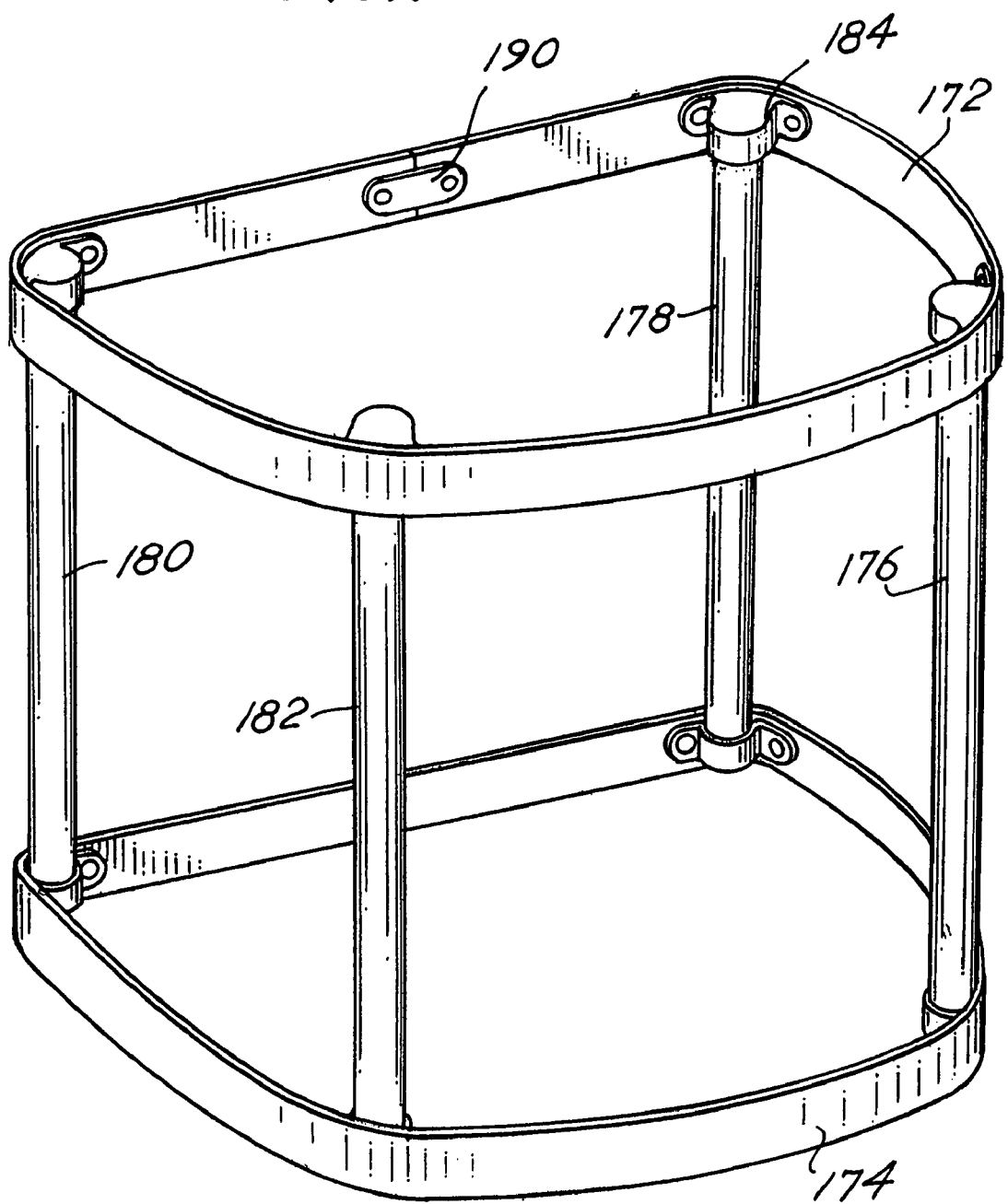
FIG. 7 is an isometric view of the frame used in the construction depicted in FIG. 6.

The embodiment further includes, as depicted in FIGS. 6 and 7, an internal side panel flap 170 which is stitched to, or joined to, the outside panel 120 along a top edge 171 of the panel 120. A frame is comprised of a first or top ring member 172, a second lower closed loop frame member 174 and connecting, longitudinal members 176, 178, 180 and 182. The frame members 176, 178, 180 and 182 may all be assembled by being snap fitted into brackets such as bracket 184 associated with ring member 172 and bracket connecting member 178. The ring members 172, 174 and longitudinal members 176, 178, 180, 182 thus are used to form a frame which fits on the inside of the passage or opening defined by the fabric panels 120 and 170 as depicted in FIG. 6. Thereafter, the panel 170 may be folded downwardly from the top edge 171 over the frame so as to form an open container or bucket with panels of the type depicted in FIG. 4. FIG. 7 illustrates in greater detail the assembly of the frame comprising the rings 172 and 174 as well as the bracket or longitudinal brace members 178, 180, 176, and 182. In a preferred embodiment, all of the members are snap fitted together. The ring member, such as ring member 172, may be made from a flexible plastic material which is joined to form a loop by means of a fastener or brace 190. Ring 174 may be assembled or fashioned in the same manner. The formed container may include various storage pouches of the type illustrated in FIG. 4 along with a carrying strap, such as strap 192, again illustrated in FIG. 4.

With the embodiment of FIGS. 4–7, a telescoping handle 134 is provided and engages against and provides a stiffening component with respect to the enclosed fabric panel 120. Additionally, the supplemental or auxiliary bottom plate 146 in combination with the bracket 126 and the telescoping handle 134 provide a means for reinforcing or providing shape to the open topped container illustrated in FIGS. 4–7. The construction of the wheels 128 and 130 in combination with the feet 152 and 154 provide that the assembled components will maintain the contents of the bag or container in a level condition. This is based on a diameter and sizing of the wheels 128, 130, as well as the size of feet 152 and 154. The lower panel 146 is retained in position by virtue of the engagement of the bayonet connectors 140 and 142 held by the fasteners 136 and 138 in their appropriate position.

Figure 8:
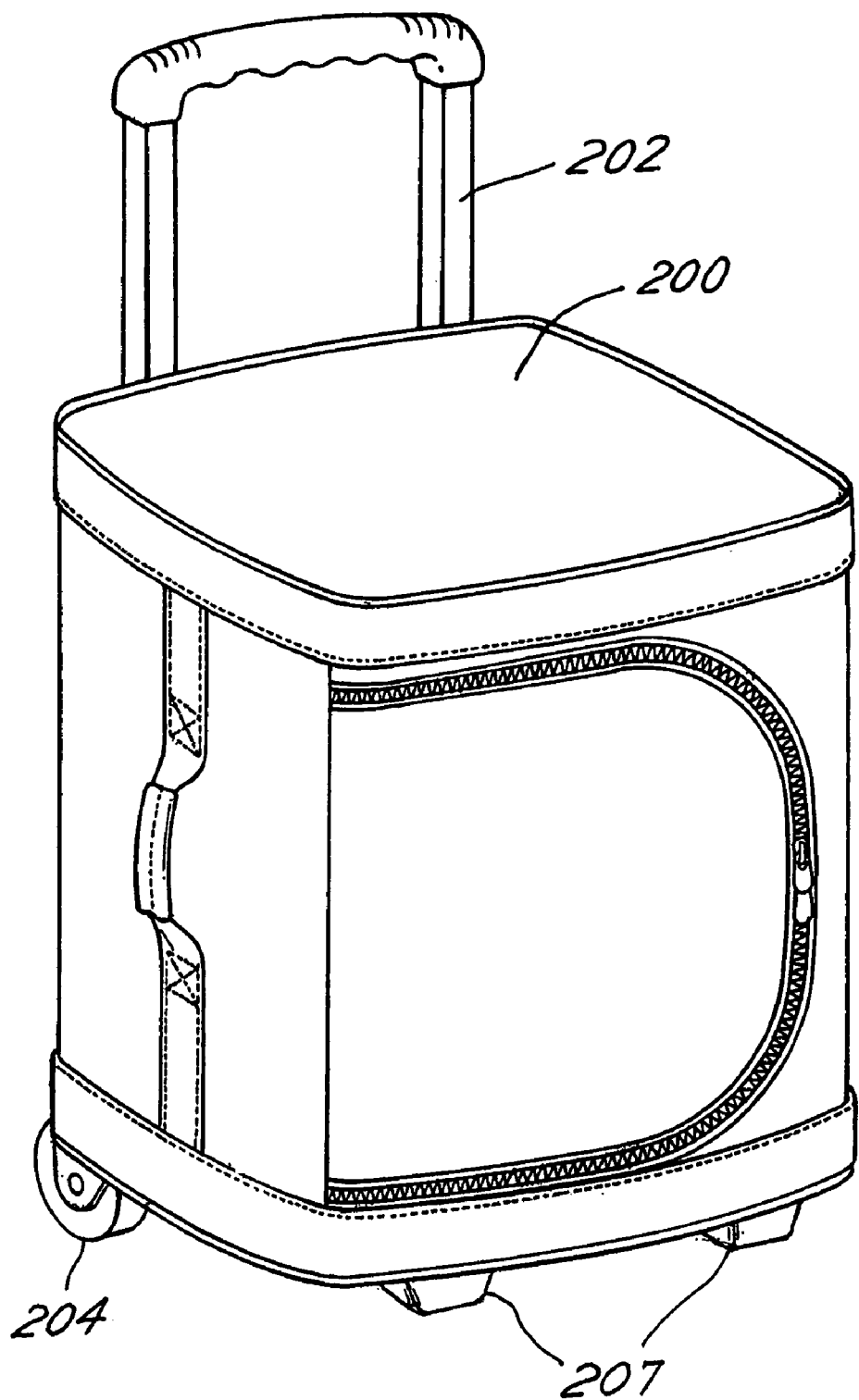
FIG. 8 is an isometric view of a duffel bag which incorporates a rigid supplemental or ancillary or auxiliary bottom panel in combination with a telescoping handle.
Figure 9:
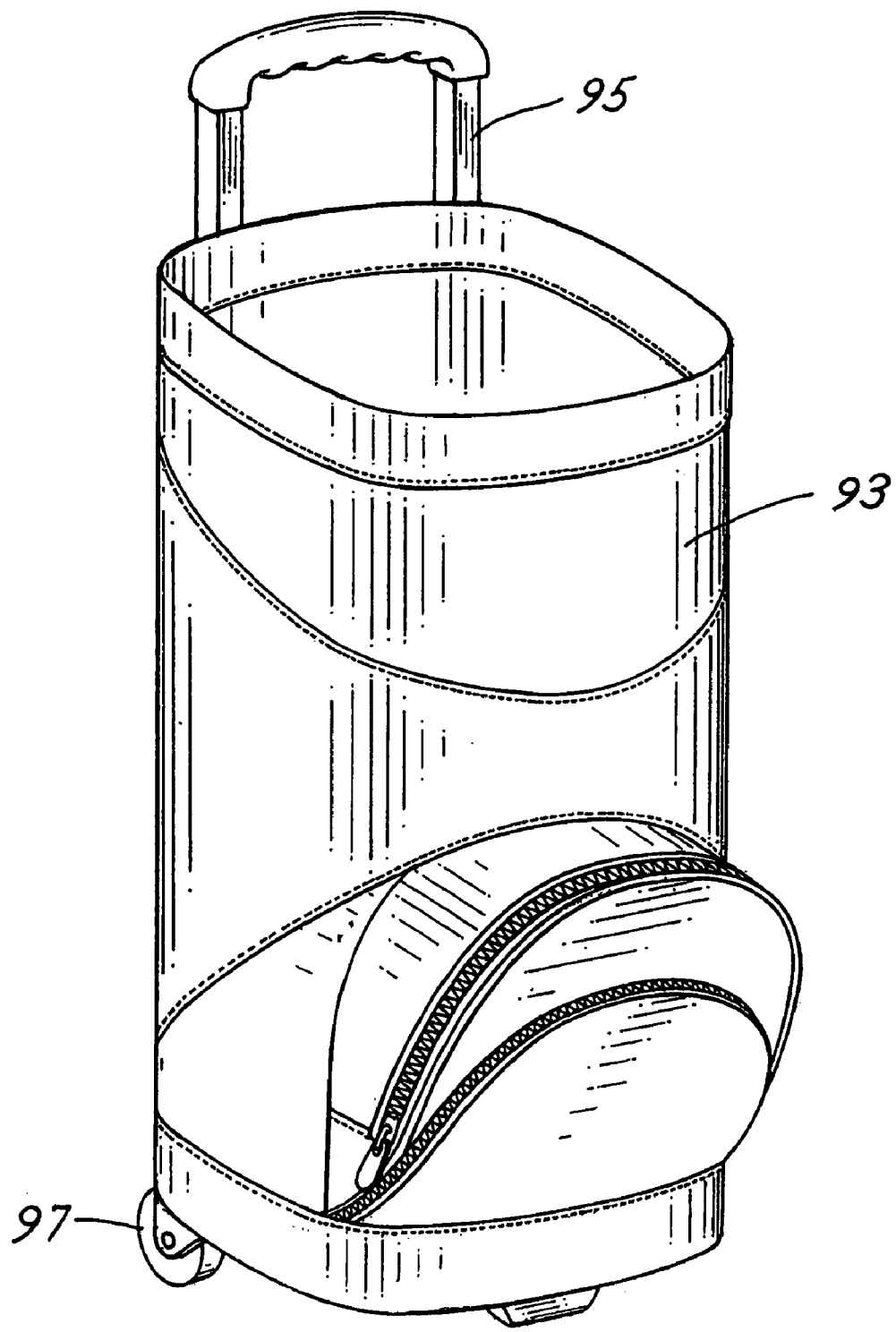
FIG. 9 is an isometric view of a golf bag or sport carrying case which incorporates features of the invention.
Figure 10:
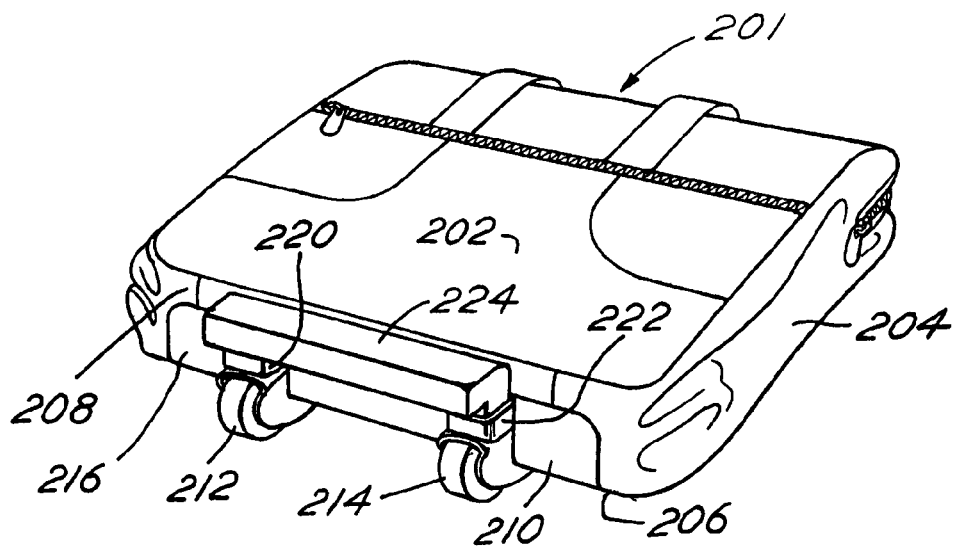
FIG. 10 is an isometric view of another embodiment of the invention depicting an insulating bag in a collapsed condition.

FIGS. 8 and 9 illustrate additional items or products which may incorporate the features of the invention. FIG. 8 is an isometric view of a duffel bag which is comprised of a flexible fabric, leather, or the like in most instances. Duffel bag 200 includes a telescoping handle 202 and wheels 204 as well as a removable, rigid bottom plate or panel (not shown) with feet 207 to support the duffel. Note that the opening to the duffel bag in this circumstance is on the side of the bag, or in other words, in the side panel.

FIG. 9 depicts an embodiment of the invention as incorporated in a golf bag. The golf bag of FIG. 9 may comprise a construction similar to that shown in FIGS. 4–7 wherein the bag is formed on frame members (not shown) which cooperate with the side panels 93 forming the bag. A telescoping handle 95, wheels 97 and a stiffening auxiliary or supplemental bottom panel are also provided.

FIGS. 10 through 16 illustrate another alternative embodiment of the invention. A collapsible bag 201, when expanded has a generally rectangular parallelpiped shape. Thus, bag 201 includes a front panel 202 and a first collapsed side panel 204 in opposition to a second, collapsed, side panel (not shown in FIG. 10). The collapsed bag 201 further includes a back panel 206 and a collapsed bottom panel 208. A rigid bracket 210 is provided at the junction or connection of the front panel 202 to the bottom panel 208. The bracket 210 supports wheels 212 and 214 as well as a stiff or rigid bracket plate 216 that fits over a small section of the compacted bottom panel 208. The bracket 210 further includes and supports a telescoping handle 218 shown in FIG. 15. Further, the bracket 210 includes a first prong reception pocket 220 and a second prong reception pocket 222 formed on the bracket 210. A foam or light plastic cleat 224 includes prongs (not shown) that fit within the bracket pockets, passages, or openings 220 and 222. In this manner, the bag 201 may be displayed and supported vertically upright by the wheels 212 and 214 as well as the cleat 224.

Figure 11:
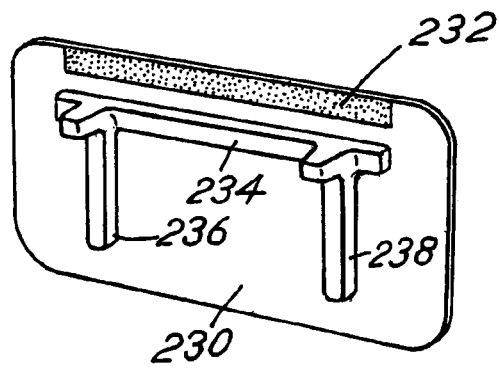
FIG. 11 is an isometric view of a rigid, supplemental bottom panel utilized in combination with the collapsed bag of FIG. 10.
Figure 12:
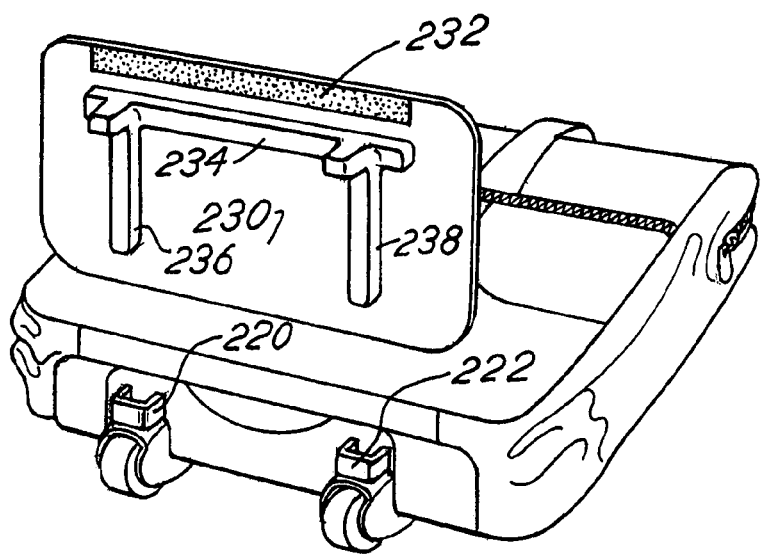
FIG. 12 is an exploded isometric view of the bag of FIG. 10 and the rigid, supplemental rigid bottom panel or plate.
Figure 13:
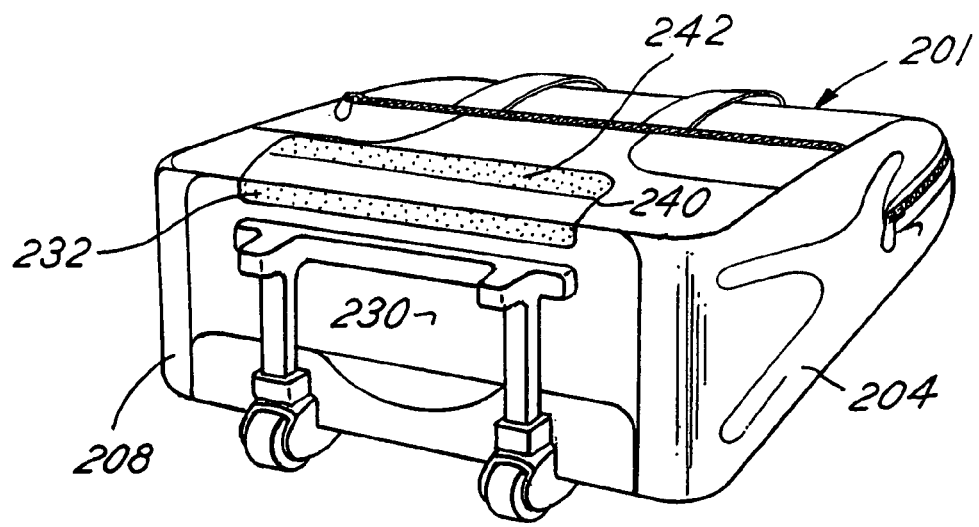
FIG. 13 is an isometric view depicting the placement of the rigid, supplemental bottom plate for the bag of FIG. 10.
Figure 14:
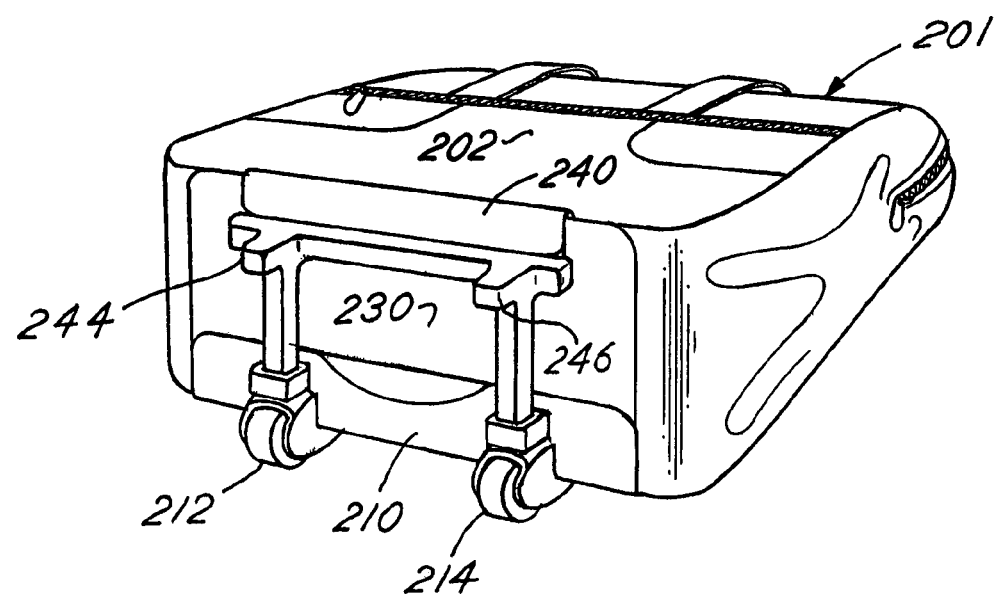
FIG. 14 is another isometric view of the bottom side of the bag of FIG. 13.

As shown in FIG. 11, a bottom panel 230 comprises a rigid, supplemental generally rectangular plate with a hook and loop fastener 232 along the outer edge thereof and with a foot assembly 234 attached to the bottom side thereof. The foot assembly 234 includes first and second horizontal prongs 236 and 238. The prongs 236 and 238 engage with or slide into the pockets 220 and 222, respectively, as depicted in FIG. 12. Then as depicted in FIG. 13, the side 204 and the opposite side (not numbered) of the bag 201 may be expanded as may be the bottom side 208 of the bag. The plate, 230 may then be positioned as shown with the prongs 236 and 238 within the openings or passages 220 and 222. A flap 240, with a hook and loop fastener 242, may then be folded over and engage the hook and loop fastener 232 of panel or plate 230. This will hold the bottom plate 230 tightly in position thereby forming the bottom 208 of the bag 201. The flap 240 thus is stitched to or attached to the front panel 202 of the bag 201. The flap 240 thus will fold over and hold the rigid plate 230 in position tightly against bottom panel 208 as depicted in FIG. 14.

The foot assembly 234 includes a first foot 244 and a laterally spaced second foot 246 which facilitate support of the bag 201 in a level condition inasmuch as the foot 244 and 246 are aligned support the bag 201 along with the wheels 212 and 214. Thus, the rigid supplemental plate or bottom panel 230 provides a multiplicity of functions. It renders the bottom of the bag 201 rigid and maintains the shape of the bottom of the bag. It engages the bracket 210 and in combination therewith provides a means for maintaining the bag 201 in a level supported condition. The panel or plate 230 when removed permits compaction of the bag or case 200 for ease of storage and transport as well as to facilitate display. In this regard, the openings or bracket passages 220 and 222 have a duel function of providing a temporary support for cleat 224 as well as cooperating with the rigid plate 230.

Figure 15:
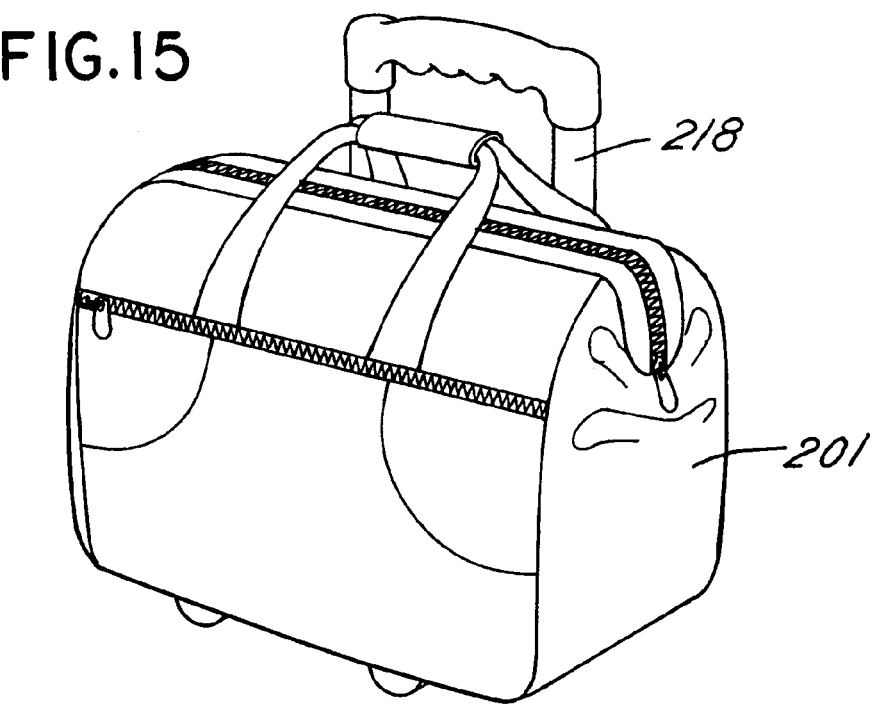
FIG. 15 is an isometric view of the bag of FIG. 10 in the fully expanded condition.
Figure 16:
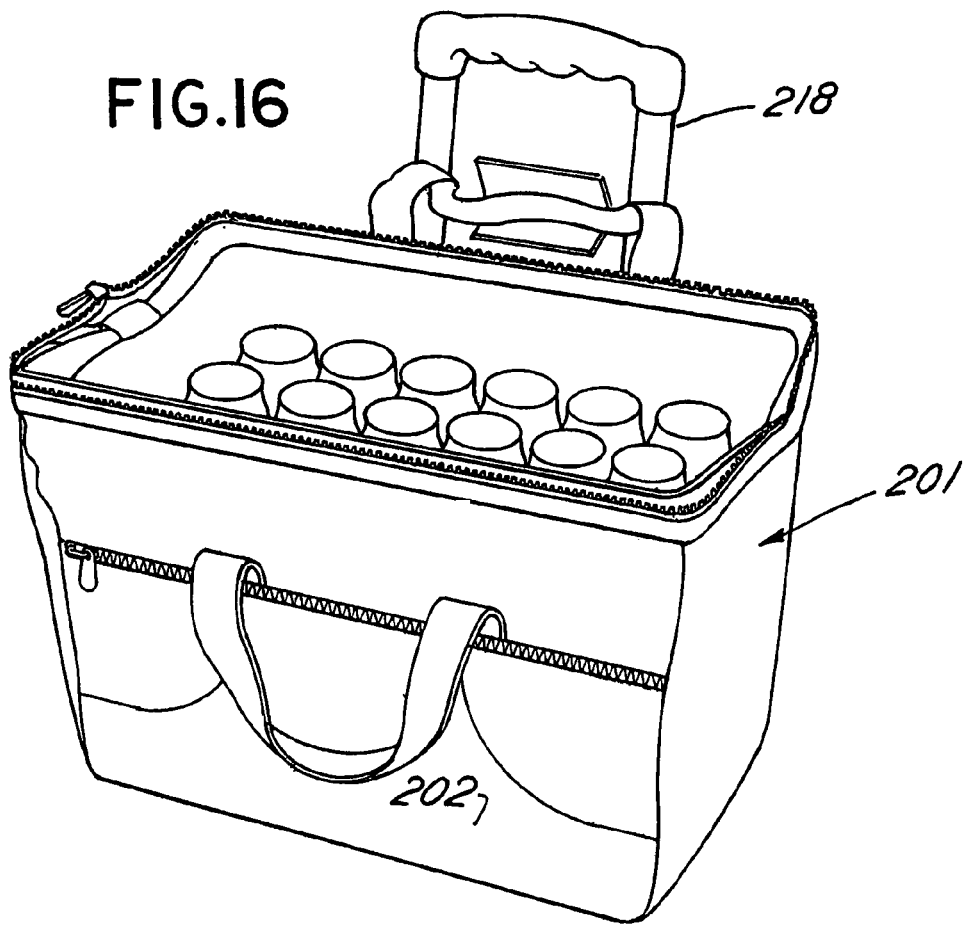
FIG. 16 is an isometric view depicting the interior configuration and arrangement in the bag of FIG. 15.
Figure 17:
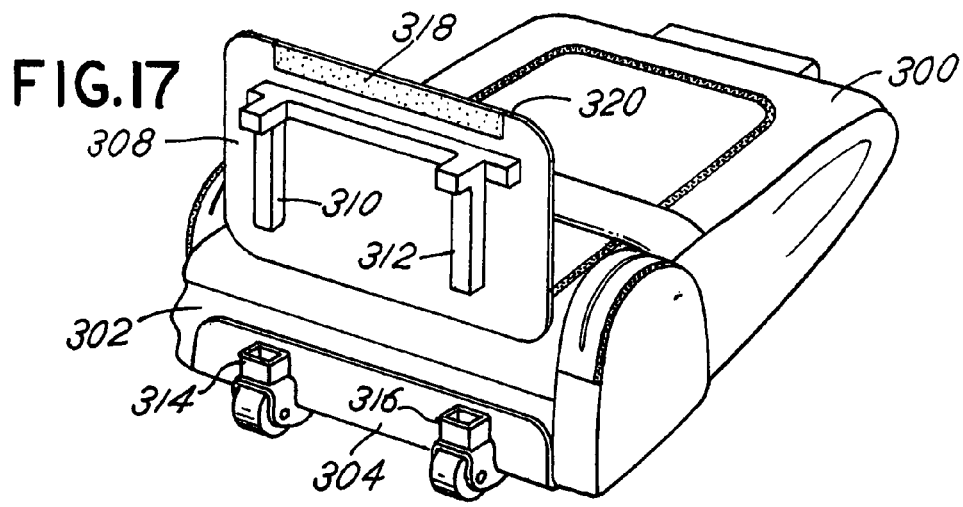
FIG. 17 is an isometric view of alternative embodiment of the invention which is especially designed for use as a pet or animal carrier.

FIG. 15 depicts the manner in which the bag 201 is supported by means of the wheels 212, 214 and the plate 230. FIG. 16 illustrates in further detail the interior of the bag 201. The bag is a wide mouth bag similar to the bag depicted in FIG. 1, for example.

Figure 18:
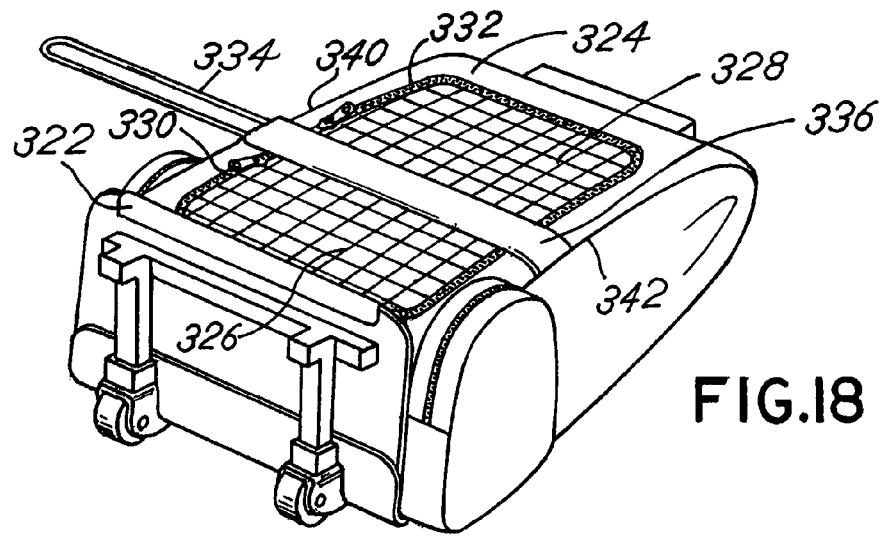
FIG. 18 is an isometric view of the embodiment of FIG. 17 further including a construction which maintains and facilitates maintenance of the configuration of the flexible bag.
Figure 19:
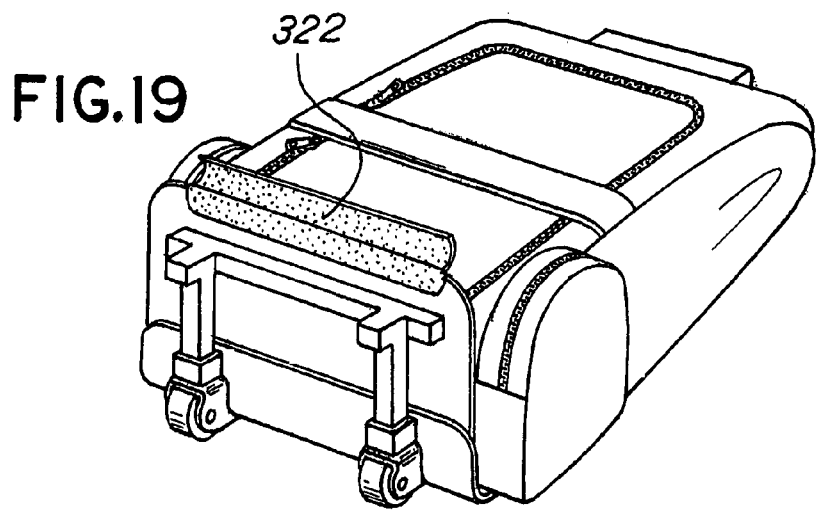
FIG. 19 is an isometric view of the embodiment of FIG. 17 illustrating the manner of attachment of the supplemental bottom panel which is a rigid panel to the flexible bottom panel of the flexible bag.
Figure 20:
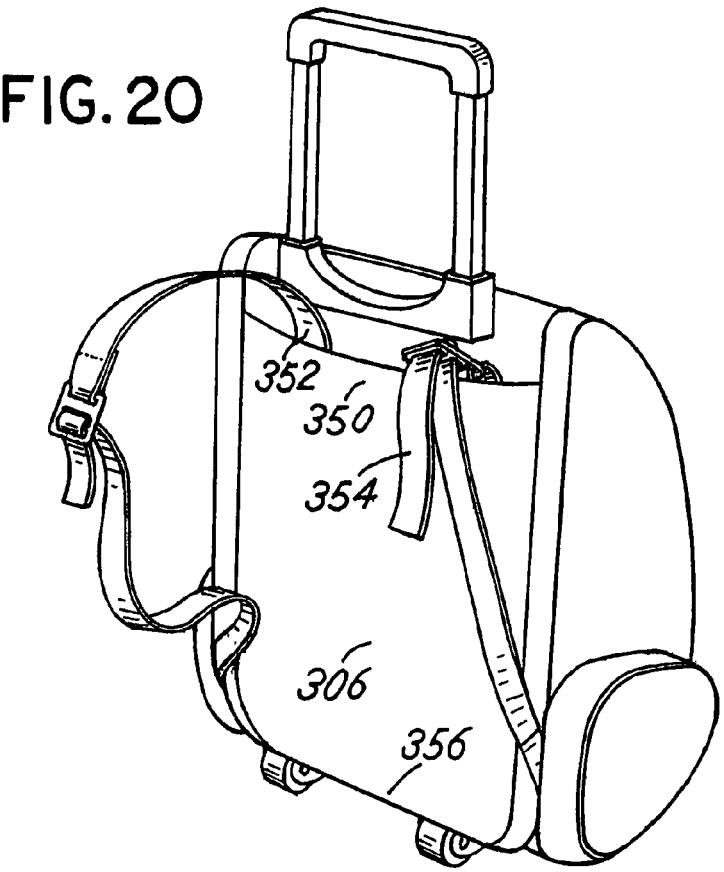
FIG. 20 is an isometric view of the first side panel of the embodiment of FIG. 17 illustrating the telescoping handle and supplemental carrying straps which enable utilization of FIG. 21 is an isometric view of the first side of the backpack configuration shown in FIG. 20.

FIGS. 17–23 illustrate yet a further embodiment of the invention which is especially useful as a pet or animal carrier. The embodiment includes a flexible bag 300 having a generally flexible bottom panel 302 with a dual wheel assembly 304 affixed to the flexible bottom panel 302 and to the first side panel 306 as depicted, for example, in FIG. 20. A rigid plate supplemental bottom wall panel 308 includes first and second spaced bayonet members 310 and 312 which are cooperative with receptacles 314 and 316, respectively, in bottom panel 302 to hold the plate 308 in position against the flexible bottom on bottom panel 302 of the bag 300. A strip of fastening material 318 is provided along upper edge 320 of the panel 308. The fastening material 318 cooperates with a fastening band 322 as illustrated in FIG. 19 as well as in FIG. 18 to retain the supplemental bottom panel 308 in position, again as illustrated in FIGS. 18 and 19.

The flexible bottom side panel 302 is connected to the flexible front side panel 324. In the preferred embodiment of the example of FIGS. 17–23, the second or front side panel 324 includes a first mesh panel 326 and a second mesh panel 328. The mesh panels 326 and 328 are attached to front panel 324 by means of a zipper mechanism 330 and 332, respectively, thereby enabling at least partial opening of the panels 326 and/or 328 for access through front panel 324 to the interior of the bag.

A wire loop or other rigid member 334 may be inserted into a pouch 336 also attached to and forming a part of the front side or front panel 324. The wire loop or reinforcing member 334 extends for the full distance between lateral sides 340 and 342 of the front panel 324 thereby providing for a means to maintain the form and shape of the bag particularly when the supplemental rigid bottom panel 308 is in position as illustrated, for example, in FIG. 18. The embodiment of the figures is especially useful as an animal carrier inasmuch as the mesh panel 328, for example, may be opened and a pet or animal placed within the carrier. The mesh penal 328 may then be closed to retain the animal in position or alternatively partially opened so that the animal may have access to the exterior of the bag.

The first side panel, or in other words the back panel, 306 of the embodiment includes a strap assembly which is useful for carrying of the bag in the form of a backpack. Referring to the figures, therefore, and in particular FIGS. 20–23, the back side panel 306 includes a pouch 350 into which a first adjustable length strap 352 and a second adjustable second strap 354 are inserted. The straps 352 and 354 extend from or adjacent the top of the back side panel 306 to the lower edge 356 of the bag. The straps 352 and 354 may be attached at any convenient place adjacent the lower edge or side 356 of the bag. In this manner as illustrated, for example, in FIG. 22, the straps 352 and 354 may be fully removed from the pouch 350 and adjusted in the length so that the backpack may be carried in the manner of a traditional backpack with an animal retained therein and having access through the mesh panel 328 previously described. Alternatively of course, the telescoping handle 360 may be extended and the wheels 362 and 364 relied upon as an alternative mode of transport of the animal carrier/backpack.

Figure 21:
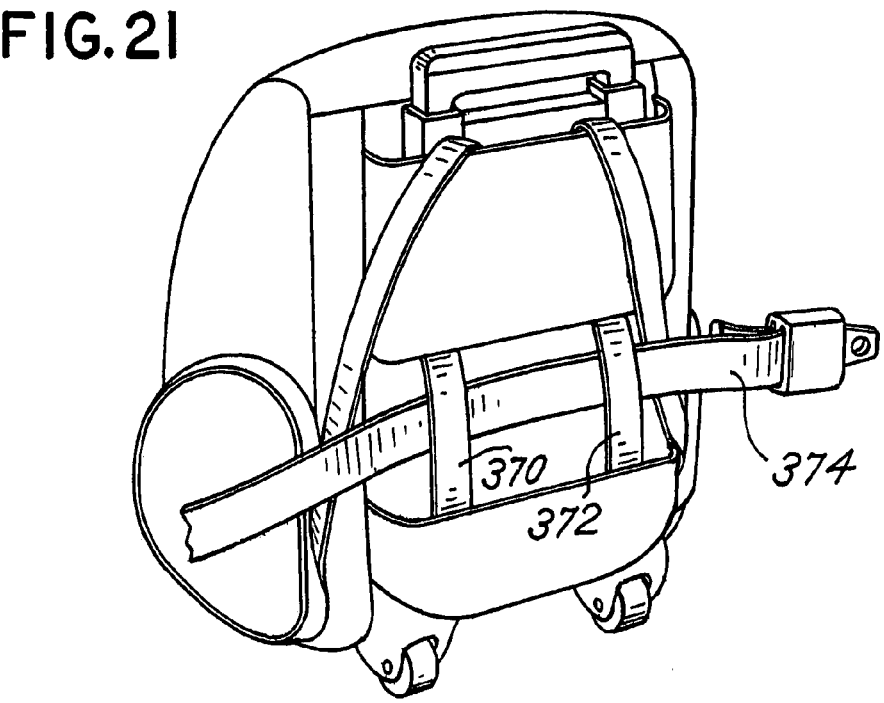
Figure 22:
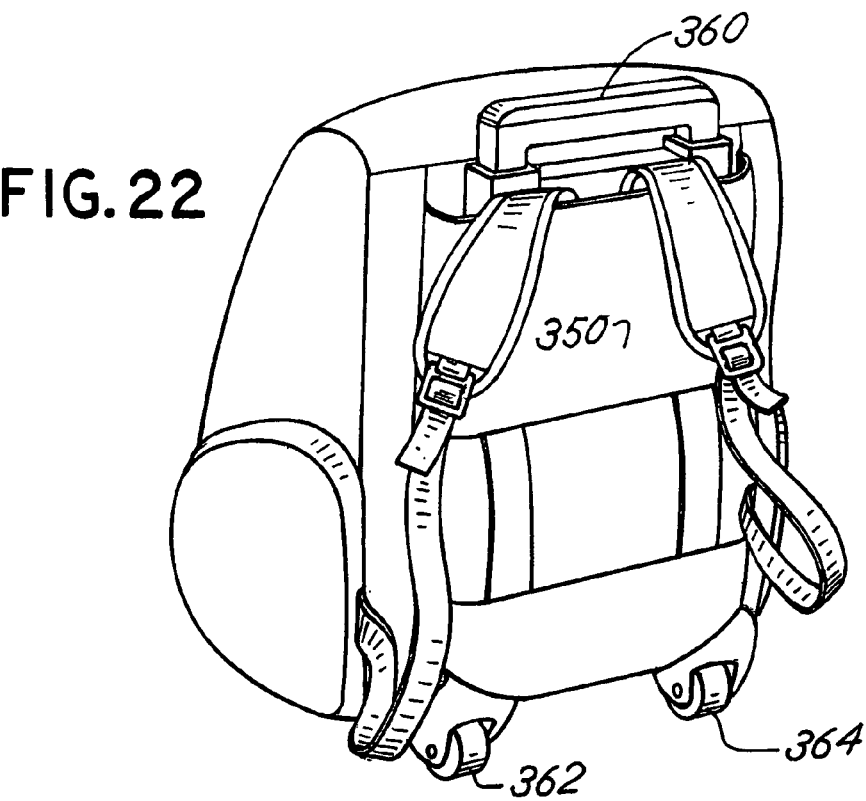
FIG. 22 illustrates a further feature of the construction of the backpack version of the bag.
Figure 23:
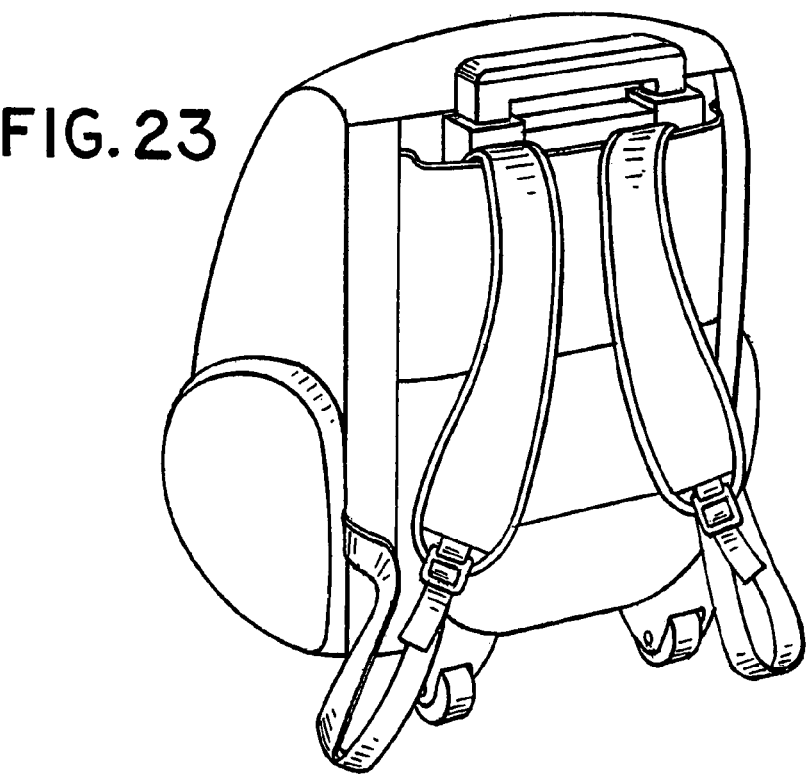
FIG. 23 illustrates yet a further feature of the backpack animal carrier version of the bag.

As a further feature of the embodiment of FIGS. 17–23, auxiliary vertical straps 370 and 372 are attached to the back side panel 306. The straps 370 and 372 define loops through which a seatbelt 374 may be passed. In this manner the bag can be placed in a vehicle and retained in a desired and appropriate orientation and position with an animal housed therein and safely maintained and retained by virtue of the utilization of a seatbelt. When used as described in this particular mode and as depicted in FIG. 21, the straps 352 and 354 are fully placed within the pouch 350. Thus, the embodiment of FIGS. 17–23 may be utilized as an animal carrier, movable by the use of the telescoping handle and wheels. It may be utilized as a carrier having a backpack feature. Finally it may be utilized for retention of the bag in the environment of an automobile for purposes of travel wherein it is retained by a seatbelt to provide for enhanced safety of the animal retained within the bag.

Other embodiments and alternative constructions of the invention are possible. The size and shape of the auxiliary or supplemental bottom panel may be varied. The number of wheels associated with the telescoping handle may be varied. The means for interconnecting the back panel with the bracket that supports the telescoping handle may be varied or altered all without departing from the spirit and scope of the invention. Thus, the invention is to be limited only by the following claims and equivalents thereof.

What is claimed is:

1. A collapsible bag construction comprising, in combination:
    a flexible bag including a first side panel with a bottom edge and a generally flexible bottom panel attached to the first side panel bottom edge to define a juncture;
    at least one bag transport wheel mounted to a bracket on the bag at the juncture;
    a telescoping handle on the firs side panel and extending upwardly from the juncture, said telescoping handle connected to said bracket at said juncture;
    a generally rigid, separate, supplemental, generally flat planar plate bottom panel having a top side, a bottom side, and a back edge; and
    an attachment mechanism on the bottom panel to attach the supplemental bottom panel to the bottom panel to engage and maintain the bottom panel generally transverse to the telescoping handle and first side panel, said supplemental bottom panel releasable from said bottom panel and from the flexible bag, said attachment mechanism including a fastener mechanism on said supplemental bottom panel for cooperation with a fastener mechanism on the outside of the bottom panel; and at least one bayonet pocket fixed to the bottom panel for slidably receiving a bayonet member affixed to the supplemental bottom panel, whereby the supplemental bottom panel is held by the fastener mechanism and bayonet member in combination.

2. The bag of claim 1 including a flexible material front side panel in opposed relation to the first side panel, said front side panel including at least one pocket.

3. The bag of claim 1 including a front side panel comprised at least in part of a mesh subpanel.

4. The bag of claim 3 wherein the mesh subpanel is at least partially detachable from the front side panel.

5. The bag of claim 1 wherein the fastener mechanism for attaching the supplemental bottom panel to the bottom panel comprises a fastening element attachable simultaneously to the supplemental bottom panel and to the bottom panel.

6. The bag of claim 1 wherein the fastener mechanism comprises a fastener strip on an outer edge of the supplemental bottom panel cooperative with a fastener strip on a flap attached to the outside of the bottom panel, whereby said flap is capable of folding over the outer edge of the supplemental bottom panel.

7. The bag of claim 1 further including a carry strap assembly on the first side panel.

8. The bag of claim 1 wherein the supplemental bottom panel includes an outside with at least one support foot.

9. A collapsible bag construction comprising, in combination:
 a flexible bag including a first side panel with a bottom edge and a generally flexible bottom panel attached to the first side panel bottom edge to define a juncture;
 at least two bag transport wheels mounted to the bag at the juncture;
 a telescoping handle on the first side panel and extending upwardly from the juncture;
 a generally rigid, separate, supplemental, generally flat planar plate bottom panel having a top side, a bottom side, a front edge, and a back edge; and
 an attachment mechanism on the bottom panel to attach the supplemental bottom panel to the bottom panel to engage and maintain the bottom panel generally transverse to the telescoping handle and first side panel, said supplemental bottom panel releasable from said bottom panel and from the flexible bag, said attachment mechanism including a fastener mechanism, the fastener mechanism comprising a fastener strip on the front edge of the supplemental bottom panel cooperative with a fastener strip on a flap attached to the outside of the bottom panel, whereby said flap is capable of folding over the front edge of the supplemental bottom panel;
 at least two bayonet pockets fixed to the bottom panel for slidably receiving bayonet members affixed to the supplemental bottom panel, whereby the supplemental bottom panel is held by the fastener mechanism and bayonet members in combination; and
 at least two support feet connected to the bottom side of the supplemental bottom panel, the support feet extending traversely from the bayonet members and toward the back edge of the supplemental bottom panel.

10. The bag of claim 9 including a flexible material front side panel in opposed relation to the first side panel, said front side panel including at least one pocket.

11. The bag of claim 9 including a front side panel comprised at least in part of a mesh subpanel.

12. The bag of claim 11 wherein the mesh subpanel is at least partially detachable from the from side panel.

* * * * *